Jan. 1, 1924 1,479,675
B. REES
LAWN SPRINKLER
Filed June 20, 1921
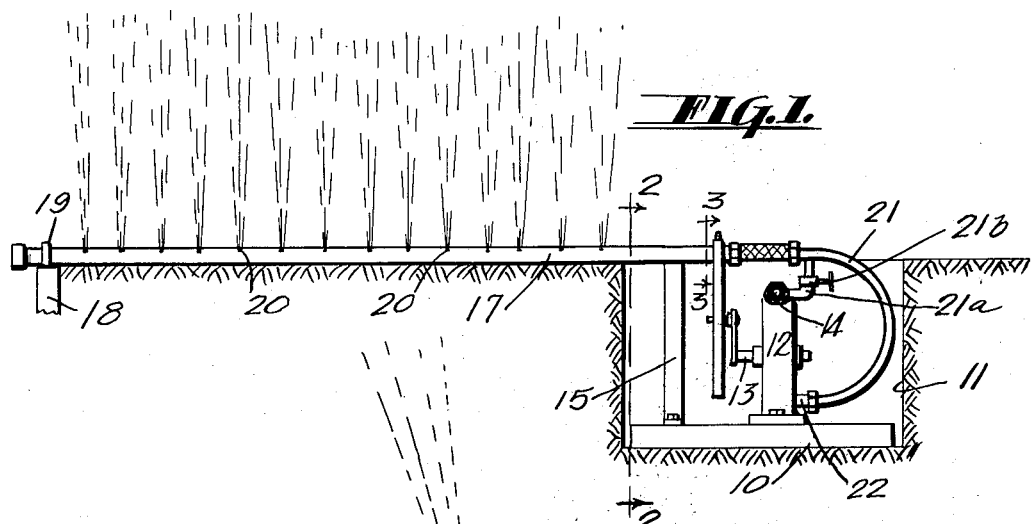
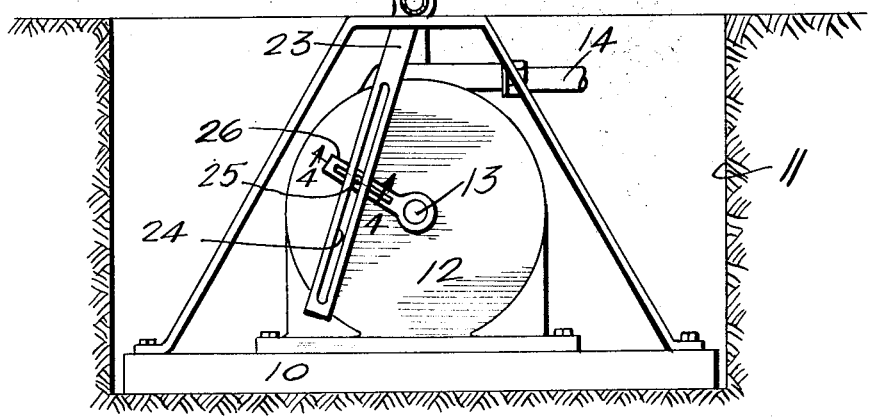
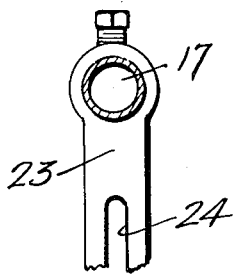
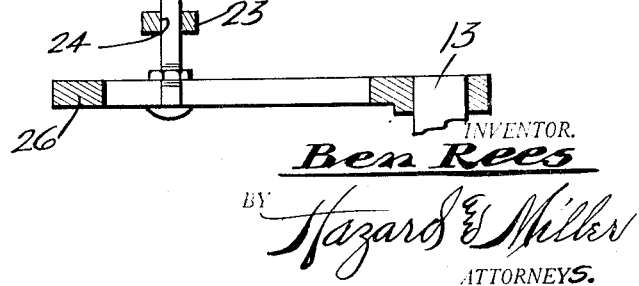
INVENTOR.
Ben Rees
BY Hazard & Miller
ATTORNEYS.

Patented Jan. 1, 1924.

1,479,675

UNITED STATES PATENT OFFICE.

BEN REES, OF ANAHEIM, CALIFORNIA.

LAWN SPRINKLER.

Application filed June 20, 1921. Serial No. 479,010.

*To all whom it may concern:*

Be it known that I, BEN REES, a citizen of the United States, residing at Anaheim, in the county of Orange and State of California, have invented new and useful Improvements in Lawn Sprinklers, of which the following is a specification.

My invention relates generally to sprinkling apparatus and more particularly to a lawn sprinkler, the principal object of my invention being to provide a relatively simple and practical lawn sprinkling device that includes an elongated sprinkling head that is mounted for rocking movement and which is actuated by the force of water that is delivered to and through said sprinkling head.

Further objects of my invention are to provide a lawn sprinkling apparatus that may be easily and cheaply installed, and which will be very effective in performing its intended functions.

With the foregoing and other objects in view, my invention consists in certain novel features of construction and arrangement of parts that will be hereinafter more fully described and claimed, and illustrated in the accompanying drawings, in which:

Fig. 1 is an elevational view of a lawn sprinkling device of my improved construction, the same being shown in position for use upon the ground and within a pit.

Fig. 2 is an enlarged vertical section taken approximately on the line 2—2 of Fig. 1.

Fig. 3 is an enlarged detail section taken approximately on the line 3—3 of Fig. 1.

Fig. 4 is an enlarged detail section taken on the line 4—4 of Fig. 2.

Referring by numerals to the accompanying drawings, which illustrate a practical embodiment of my invention, 10 designates a block that forms the base of my improved apparatus, the same being positioned in the bottom of a shallow pit or depression 11 that is formed in the ground adjacent to the lawn that is to be sprinkled, and mounted on said base is a water motor 12 of suitable construction, preferably of the type having a centrally arranged shaft 13 that is rotated by the pressure of water on radially disposed vanes or blades and said water being delivered to the housing of the motor through a suitable supply pipe 14.

Arranged on the base to the side of the motor 12, is an upright bracket 15 that serves to support one end of a horizontally disposed tube or base 17 that occupies a position on the surface of the lawn that is to be sprinkled.

Seated in the ground near the outer end of the tube 17 is a stake or block 18 having a suitable bearing 19 for the outer portion of the pipe or tube 17.

Formed in the upper portion of the tube or pipe 17 is a series of jet openings 20 that are arranged to discharge jets of water upwardly and outwardly from said tube.

Connected to the end of tube 17 that is positioned over the pit or depression 11, is a short flexible tube 17$^a$, and connected thereto is the upper end of a downwardly extending curved tube 21 the lower end of which is connected to the discharge nipple 22 of the water motor.

Connecting the upper portion of curved tube 21 with the supply pipe 14, is a by-pass pipe 21$^a$ in which is located a valve 21$^b$.

Clamped on the tube 17 adjacent to the end that is positioned over the pit 11, is the upper end of a rocker arm 23 that is provided with a longitudinally disposed slot 24, and passing through said slot is a pin 25 that is adjustably seated in a slotted crank arm 26 that is carried on the end of the water motor shaft 13.

In the practical operation of my improved lawn sprinkler, the force of the water delivered to motor 12 through supply pipe 14 causes the vanes or blades within the housing to rotate, and consequently rotating shaft 12.

By virtue of the arrangement of pin 25 in slot 24, the rotary motion of shaft 13, shown as substantially parallel with the pipe 14, is converted into vibratory movement and imparted to rocker arm 23, and as the upper end of the latter is clamped on pipe 17, said pipe will be rocked in its bearings 15 and 19 and as a result of such rocking movement, the jets of water issuing from the apertures 20 in said pipe 17 will be distributed over a relatively wide area on both sides of the apparatus. It will be understood that the water, after passing through the motor 12, is delivered to the rocking jet pipe 17 through flexible tube 21.

By adjusting the position of the pin 25 toward or away from the axis of the slotted arm 26, and which is the shaft 13, the degree of rocking movement imparted to jet tube 17 may be very accurately regulated. By proper manipulation of the valve 21$^b$ in by-pass pipe 21ᵃ, the speed at which the perforated pipe is rocked may be accurately controlled.

A lawn sprinkling device of my improved construction is comparatively simple, may be easily and cheaply produced, and provides efficient means for sprinkling lawns. The jet pipe 17 may be of any length desired, and in some instances it may be found desirable to form, alongside of the lawn or area to be sprinkled, a trench or depression, in which event the apparatus can be readily shifted lengthwise of said trench so as to effectively sprinkle portions of the lawn adjacent to said trench.

It will be readily understood that minor changes in the size, form and construction of the various parts of my improved lawn sprinkler may be made and substituted for those herein shown and described without departing from the spirit of my invention the scope of which is set forth in the appended claims.

I claim as my invention:

1. The combination, with a rotary water motor having an axially disposed shaft, of a perforated pipe mounted for rocking movement in suitable bearings and on an axis substantially parallel with said shaft, a connection from the discharge side of the water motor to said pipe, a slotted arm secured to said pipe, and a crank fixed to the shaft of the water motor and having a portion arranged in the slot in said arm whereby rocking movement is imparted to the perforated pipe as the water motor is rotated.

2. The combination, with a rotary water motor having an axially disposed shaft, of a perforated pipe mounted for rocking movement in suitable bearings and on an axis substantially parallel with said shaft, a connection from the discharge side of the water motor to said pipe, a slotted arm secured to said pipe, a crank fixed to the shaft of the water motor and having a portion arranged in the slot in said arm whereby rocking movement is imparted to the perforated pipe as the water motor is rotated, and a valved by-pass pipe leading from the intake side of the water motor to the connection from the discharge side of said motor to said perforated pipe.

3. The combination, with a rotary water motor having an axially disposed shaft, of a perforated pipe mounted for rocking movement in suitable bearings, a flexible tube connected to the end of said perforated pipe adjacent to said water motor, a curved pipe leading from the discharge side of the water motor to said flexible tube, a valved by-pass pipe arranged between said curved pipe and the intake side of the water motor, a slotted arm secured to the perforated pipe, a slotted arm secured to the shaft of the water motor, and a pin adjustably seated in the last named slotted arm, which pin passes through the slot in the arm that is carried by the perforated pipe.

In testimony whereof I have signed my name to this specification.

BEN REES.